July 25, 1967 J. JANK 3,332,460
ADJUSTABLE GANG SAW
Filed April 14, 1965 2 Sheets-Sheet 1
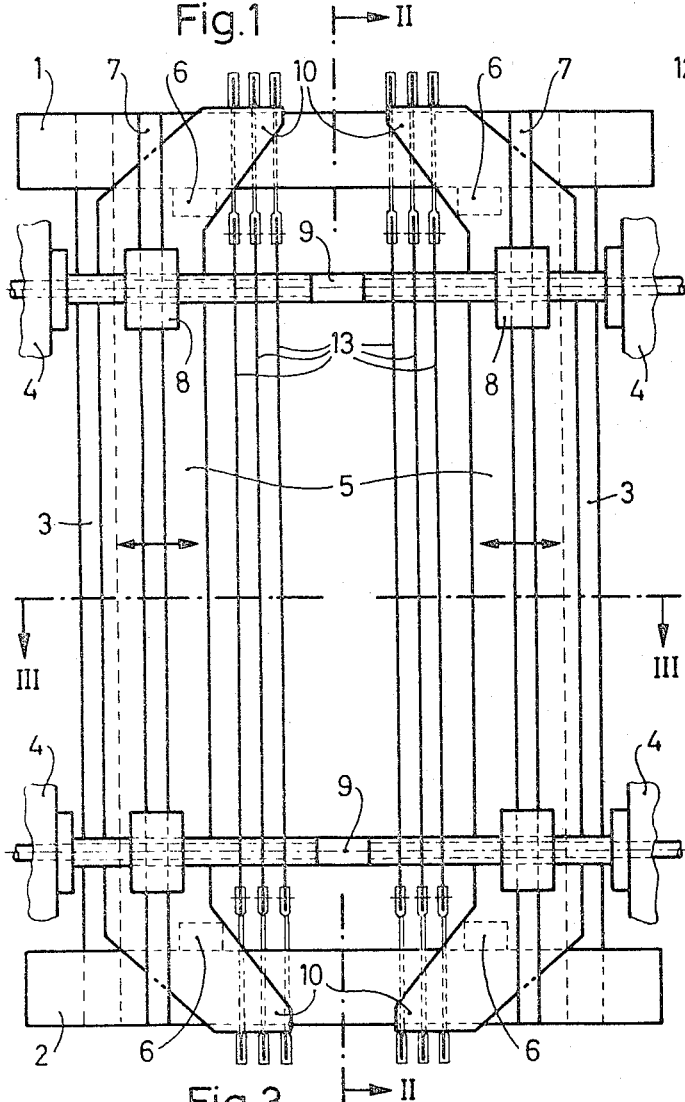
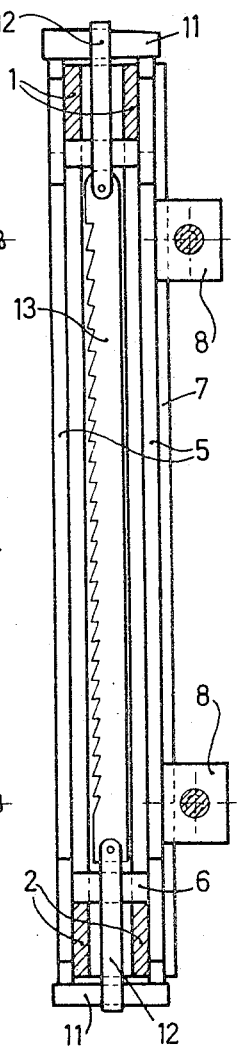
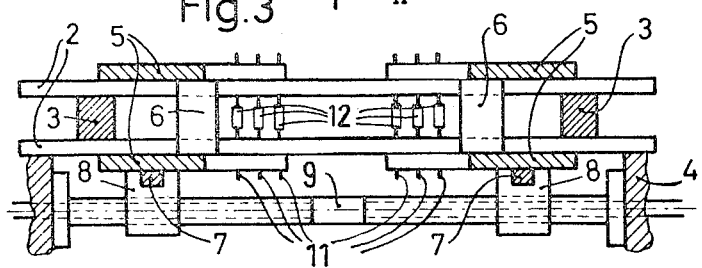

July 25, 1967   J. JANK   3,332,460
ADJUSTABLE GANG SAW
Filed April 14, 1965   2 Sheets-Sheet 2
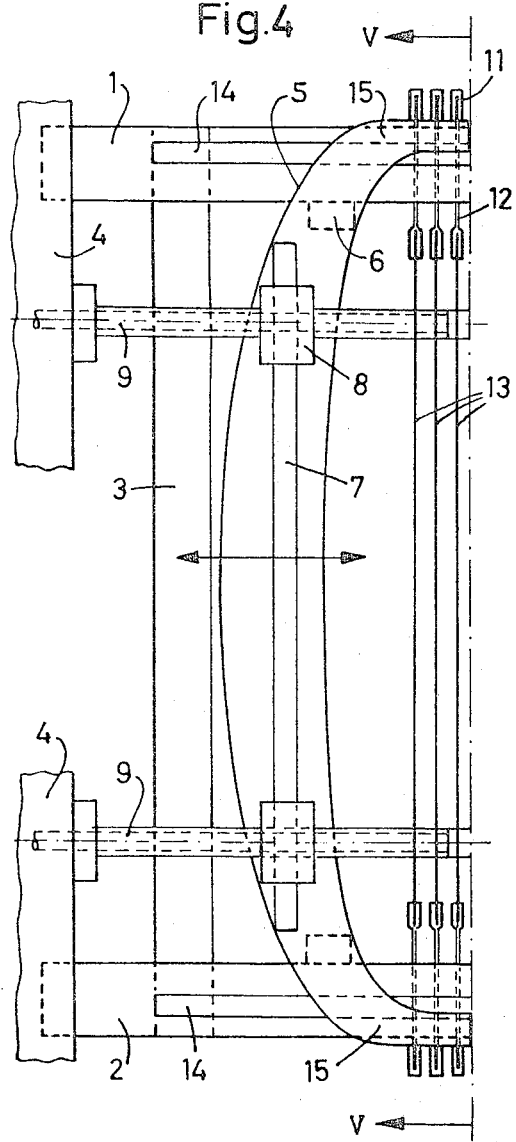
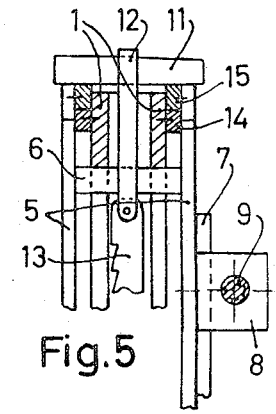
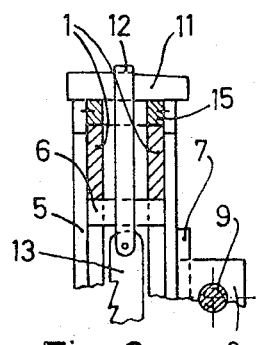
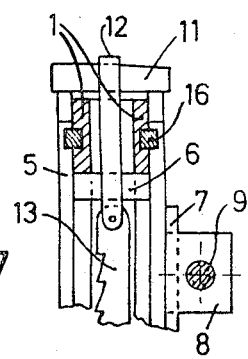

3,332,460
ADJUSTABLE GANG SAW
Johann Jank, Kissingerstr. 59, Hammelburg, Germany
Filed Apr. 14, 1965, Ser. No. 448,013
Claims priority, application Germany, Apr. 17, 1964,
J 25,668
9 Claims. (Cl. 143—156)

My invention relates to an adjustable gang saw whose saw blades are arranged in two groups which are steplessly adjustable relative to each other during idling of the gang-sash frame. There are known gang saws of this type for cutting planks of various thickness which avoid the comparatively long change-over time required for conventional sash frames by having the saw blades mounted on slides. These are arranged in pairs on the top and bottom beams of the sash frame and are adjustable relative to each other by means of gears, so that the spacing between each of the two groups of saw blades fixed to one pair of slides is steplessly adjusted and, with the frame running, may be adapted to the thickness of the particular trunk to be sawed.

In the known adjustable gang saws, however, the tension of the saw blades must be taken up by the glide bearings of the slides, which makes it very difficult to adjustably displace the slides. For this reason the top and bottom beams of the sash frame, as well as the slides, must be equipped with carefully finished glide bearings which are exposed to the rugged sawing operations. Another disadvantage is the fact that the slides are not suitable for subsequent addition to standard gang sashes.

It is an object of the invention, to obviate these disadvantages.

More specific objects of my invention are to provide an adjustable gang saw which effects an increase in the throughput width of the sash and in which an increase in the tension of the saw blades is possible due to the accommodation of the effective cross section of the bow-shaped bracer members thereof to the stress conditions that arise.

Another object of my invention is to provide a safe and reliable gang saw at low cost which can always be adjustable to the required cutting width with low power outlay because the tension of the saw blades is absorbed by the semi-frames thereof and the adjusting bearings thereby remain tension-free.

A further object of my invention is to provide an adjustable gang saw that is readily convertible from any conventional gang saw without requiring any material change in the structure of the original apparatus.

An additional object of my invention is to provide an adjustable gang saw with a very high cutting speed wherein the static load capacity of the supports are always adequate to maintain the required tension of the saw blades even in the load condition of the gang saw.

It is a further object of my invention to provide a gang saw wherein the tension of the saw blades is increased without impairing the easy adjustability of the semi-frames thereof.

To this end, and in accordance with my invention, I provide an auxiliary partial frame on at least one side of the sash structure and guide the auxiliary frame for horizontal displacement relative to the sash, the auxiliary frame having top and bottom abutments which transversely protrude over the horizontal top beam and under the bottom beam respectively of the sash structure and are provided within respective wedge-seating surfaces for fastening the saw blades.

According to another feature of the invention, the adjustability is considerably improved by mounting two semi-frames horizontally displaceably relative to each other, on the sash frame. Preferably the semi-frames consist of supports arranged on both sides of the sash frame and rigidly interconnected in pairs by means of cross bars resting respectively on the upper edge of the bottom beam and the lower edge of the top beam, so that the semi-frames are fixed in the vertical direction relative to the sash frame.

In accordance with yet another feature of my invention, I provide an adjusting rail extending parallel to the travel direction of the sash frame and fastened at each semi-frame. The rail is provided with two adjusting nuts connected in pairs by horizontal adjusting spindles. The adjusting nuts have a right-hand thread in the adjustment range of the one semi-frame and a left-hand thread in the adjustment range of the other semi-frame. They are carried on both sides in a sash frame support, and are displaceable by suitable gearing.

According to another feature of the invention, the load capacity of the semi-frames for heavy-duty sashes is increased by constructing the bracer members in curved or bowed form, the cross-sectional area thereof diminishing steadily from the center to the ends thereof forming the bearing or support surfaces.

According to a further feature of my invention, horizontal bearing surfaces are located at the bracer members in the vicinity of the top and bottom beams and are braced against counter-bearings located at the top and bottom beams.

Other features which are considered as characteristic for the invention are set forth in the appended claims.

Although the invention is illustrated and described herein as embodied in adjustable gang saw, it is nevertheless not intended to be limited to the details shown since various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings, in which:

FIG. 1 is a front elevational view of the sash frame in the cutting direction;

FIG. 2 is a cross-sectional view of FIG. 1 taken along the line II—II in the direction of the arrows;

FIG. 3 is a cross-sectional view of FIG. 1 taken along the line III—III in the direction of the arrows;

FIG. 4 is a fragmentary view of the sash frame of FIG. 1 modified with a bow-shaped partial frame;

FIG. 5 is a cross-sectional view of the top beam of the sash frame shown in FIG. 4, taken along line V—V in the direction of the arrows; and FIGS. 6 and 7 are views of the embodiment of FIG. 5 with modified support bearings.

Referring now to the drawing and first particularly to FIGS. 1 to 3, there is shown a sash frame formed by a top beam 1 and a bottom beam 2 rigidly connected by columns 3 and vertically and adjustably supported by non-illustrated suitable guides in a sash support 4.

On both sides of the sash frame there are respectively arranged a horizontally adjustable semi-frame formed of two bracer members 5 rigidly connected in pairs by cross bars 6. The cross bars 6 respectively abut the top beam 1 and bottom beam 2 and form with these beams 1, 2 the horizontal guide of the semi-frames, while the guide in the direction of cutting or sawing is formed by the projecting ends of the bracer members 5 which are bent toward each other and lie up against a side of the top beam 1 and bottom beam 2, respectively.

The bracer members 5 of each semi-frame are respectively provided with a vertical adjusting rail 7 which engages in a slot suitably formed in a face of adjusting nuts 8. The adjusting nuts 8 are mounted on and connected in pairs by adjusting spindles 9, the cooperating adjusting nuts of one semi-frame being provided with a right-hand thread and the cooperating nuts of the other semi-frame being provided with a left-hand thread. The adjusting spindles 9 are mounted in the sash rack or support 4 and are adjustable in a well known manner by a suitable common drive not shown in the drawings, so that the semi-frames may be moved toward or away from one another.

The mutually approaching ends 10 of the bracer members 5 which form the semi-frames project beyond the upper limiting surface of the top beam 1 and the lower limiting surface of the bottom beam 2 to an extent that their upper and lower end surfaces respectively form supports for the chucking wedges 11 which engage in the pivots 12 of the saw blades 13, so that the tension of the saw blades 13 is taken up exclusively by the bracer members 5. The chucking of the saw blades is effected in a conventional manner, the spacing of the saw blades 13 being determined by gauges that are well known to the man of skill in the art.

In the modified embodiment of FIGS. 4 and 5, bow-shaped bracer members 5 are located on both sides of the sash frame, and are connected by cross bars to form a semi-frame, the cross-sectional area of the bracer members, from the center thereof toward the ends projecting beyond the support surfaces of the top and bottom beams 1 and 2, respectively, decreasing in accordance with the load conditions.

In order to absorb the additional forces occurring during the load condition of the sash, bearing surfaces 14, parallel to the adjustment direction of the semi-frames are located at the top beam 1 and the bottom beam 2, suitable counter-bearings 15 being provided for these at the bracer members 5.

Since these counter-bearings take up in whole or in part the additional stresses appearing during operation, a higher cutting velocity is possible in a gang saw constructed in this manner than would be the case in a gang saw without additional bearings. The adjustability of the semi-frames during idling is not impaired by these features for during such operating conditions the tension of the saw blades is entirely or at least largely absorbed by the bracer members forming the semi-frames.

In the modified embodiment of FIG. 6, the upper end surface of the top beam 1 and correspondingly also the non-illustrated lower end surface of the bottom beam 2 form the bearing surfaces 14 while the counter-bearings 15, in a manner similar to that of FIG. 4, are located at the bracer members 5.

In the modified embodiment of FIG. 7, the additional forces arising during loading of the sash are transmitted by cross rods 16 inserted in slots formed in the top beam 1 and which also are inserted in corresponding transverse slots of the bracer members 5. In a similar way, additional bearings are located at the non-illustrated bottom beam.

I claim:

1. In an adjustable gang saw having vertical saw blades arranged in two groups adjustable relative to one another, the combination of a vertically reciprocable sash structure having horizontal top and bottom beams respectively, an auxiliary partial frame located on at least one side of said sash structure and being guided on said structure for horizontal displacement relative thereto, said auxiliary frame having top and bottom abutments transversely protruding over said top beam and under said bottom beam respectively of said sash structure, said abutments having respective wedge-seating surfaces for fastening the saw blades.

2. In an adjustable gang saw having vertical saw blades arranged in two groups adjustable relative to one another, the combination of a vertically reciprocable sash structure having horizontal top and bottom beams respectively, a pair of auxiliary semi-frames located on opposite sides of said sash structure and being guided on said structure for horizontal displacement relative thereto, said auxiliary frames having top and bottom abutments transversely projecting over said top beam and under said bottom beam respectively of said sash structure, said abutments having respective wedge-seating surfaces for fastening the saw blades.

3. Adjustable gang saw according to claim 2 wherein each of said semi-frames comprises a plurality of bracer members sandwiching said sash structure therebetween and cross pieces extending transversely to said sash structure and rigidly connecting said bracer members together in pairs, said cross pieces abutting against the lower edge of said top beam and the upper edge of said bottom beam respectively.

4. Adjustable gang saw according to claim 3 wherein said bracer members have top and bottom end portions angularly disposed toward a middle portion thereof.

5. Adjustable gang saw according to claim 3 wherein said bracer members are bow-shaped and have a cross-sectional area steadily decreasing from the middle to the top and bottom abutment ends thereof.

6. Adjustable gang saw according to claim 3 including horizontal bearing means located at said bracer members in the vicinity of said top and bottom beams respectively, and counter bearings abutting against said top and bottom beam, respectively, and supporting said horizontal bearing means.

7. Adjustable gang saw according to claim 3 including cross rods located respectively in slots formed in said top and bottom beams, said cross rods also extending into respective slots formed in said bracer members.

8. Adjustable gang saw according to claim 3 wherein each of said semi-frames is provided with an adjustment rail extending parallel to the direction of reciprocation of said sash structure, at least one adjusting nut located adjoining said rail, a horizontal adjusting spindle extending through said adjusting nuts respectively adjoining each of said rails and connecting said adjusting nuts pairwise, said spindle having one length formed with a high-hand thread adjacent one of said semi-frames and another length formed with a left-hand thread adjacent the other of said semi-frames, each of said lengths being threaded in one of said adjusting nuts respectively.

9. Adjustable gang saw according to claim 8 wherein each of said adjusting nuts is formed with a slot in which a respective adjustment rail engages.

References Cited

UNITED STATES PATENTS 2,820,492   1/1958   Traben _____ 143—156

DONALD R. SCHRAN, *Primary Examiner.*